L. TAUB.
STRAINER.
APPLICATION FILED JUNE 5, 1919.
1,357,744. Patented Nov. 2, 1920.
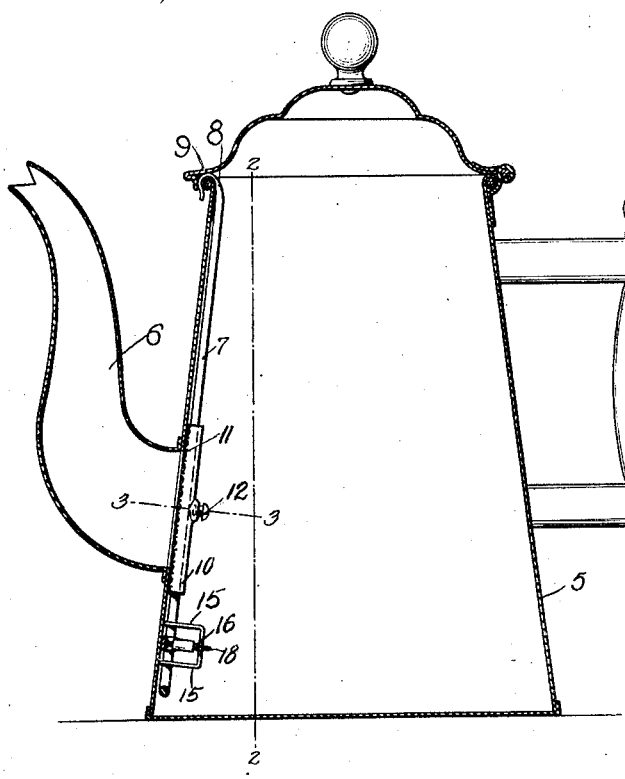
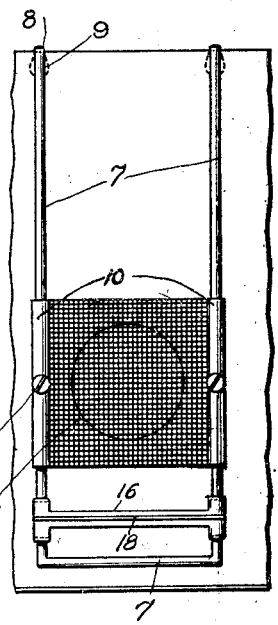
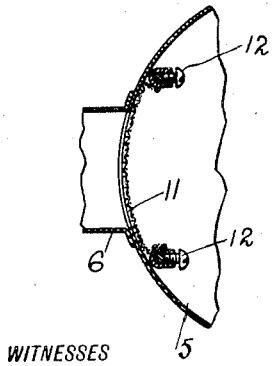
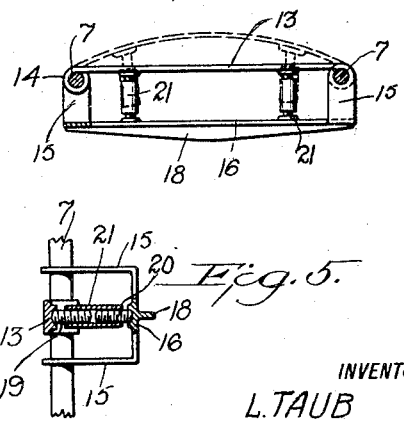
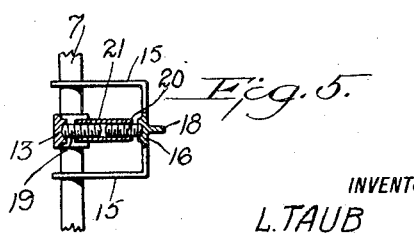
WITNESSES
INVENTOR
L. TAUB
BY
ATTORNEYS

UNITED STATES PATENT OFFICE.

LEO TAUB, OF JERSEY CITY, NEW JERSEY.

STRAINER.

1,357,744.　　　　Specification of Letters Patent.　　Patented Nov. 2, 1920.

Application filed June 5, 1919. Serial No. 301,926.

*To all whom it may concern:*

Be it known that I, LEO TAUB, a citizen of the United States, and a resident of Jersey City, in the county of Hudson and State of New Jersey, have invented a new and Improved Strainer, of which the following is a full, clear, and exact description.

The present invention relates to new and useful improvements in tea-pots, coffee-pots and similar cooking utensils, and it pertains more particularly to a strainer for such cooking utensils.

The primary object of the invention is to provide a device of this character in which the strainer is adjustable with respect to the pouring spout of the utensil regardless of its position on the body thereof.

A further object of the invention is to so construct a strainer that it may be caused to conform to the contour of the walls of the utensil with which it is used.

With the above and other objects in view, reference is had to the accompanying drawings in which—

Figure 1 is a vertical sectional view of a tea-pot with the strainer in place therein;

Fig. 2 is a view in elevation of the strainer taken on the line 2—2 of Fig. 1;

Fig. 3 is a sectional view on the line 3—3 of Fig. 1;

Fig. 4 is a detail horizontal sectional view;

Fig. 5 is a detail vertical sectional view.

Referring more specifically to the drawings, the reference character 5 designates a tea-pot or similar container, and 6 designates the pouring spout thereof, and in the type of pot shown in the drawings, the pouring spout 6 is arranged near the bottom of the pot, but as will appear hereinafter, the device is not limited to use in connection with a pot of this type.

The reference character 7 designates an elongated U-shaped member, and the free or upper portion of each of the legs of this U-shaped member is bent to provide a hook or the like 8. These hooks 8 are adapted to fit over the upper edge of the pot and to permit of a tight closing of the lid, said hooks being flattened as shown at 9.

Slidably mounted on the legs of the U-shaped member 7, is a metallic frame 10, which frame carries a wire-mesh strainer 11, as best seen in Fig. 2. The reference character 12 designates set screws or the like, by means of which the frame 10 and strainer 11 are secured in their adjusted position relative to the legs of the U-shaped member.

Connecting the legs of the U-shaped member 7 and slidably mounted thereon, is a transversely-extending bar 13, said bar 13 having its ends bent around said legs as at 14. Spaced from said bar 13, by means of the spaced ears 15, is a bar 16, which is provided with a stiffening rib 18 on its outer face.

Carried near each end of each of the bars 13 and 16, are screw-threaded bolts 19 and 20 respectively, and in engagement with said bolts are sleeves 21.

The operation of the device is as follows: The upper ends of the legs of the U-shaped members are hooked over the upper edge of the pot and the strainer is adjusted to its proper position, *i. e.*, at the entrance to the pouring spout, 6, in which position it is secured by means of the set screws 12.

Should the strainer not conform to the curvature of the walls of the pot, the sleeves 21 are rotated to flex the strainer and the U-shaped member 7 to the position shown in dotted-line position in Fig. 4, in which position it will lie in contact with the walls of the pot.

By this construction it will be apparent that the strainer can at all times be adjusted to the curvature of the various pots with which it is used, and, at the same time, its vertical adjustment adapts it to pots regardless of the location of their pouring spouts.

What is claimed is:

1. A device of the character described comprising a suitable support, a strainer carried by said support, and means for flexing said support and strainer substantially as described.

2. A device of the character described comprising a substantially U-shaped support, a strainer adjustably carried by said support, and means for flexing said support and strainer substantially as described.

3. A device of the character described comprising a substantially U-shaped support having hooked ends, a strainer slidably mounted on the legs of said U-shaped support, means for securing said strainer against movement relative to said support, and means for flexing said U-shaped support and said strainer in a transverse plane.

4. A device of the character described comprising a suitable support, and a strainer adjustable vertically of said support, said strainer through the medium of its own resiliency being adapted to conform itself to curves of varying radii.

5. In combination with a cooking utensil, a support having hook ends adapted to engage over the open end of said cooking utensil, and a flexible strainer adjustably carried by said support, said adjustable strainer adapted through the medium of its own flexibility to conform itself to the curve of said cooking utensil.

6. A device of the character described comprising a suitable attaching means, and a strainer carried by said attaching means, said strainer adapted through the medium of its own resiliency to conform itself to curves of varying radii.

7. A device of the character described comprising a suitable support having hook ends adapted to engage the edge of a suitable receptacle, a strainer adjustable vertically of said support, and means for securing said strainer in adjusted position.

8. In combination with a beverage container, having a dispensing spout, of a strainer adapted to be inserted into said container and a frame capable of engaging an edge of said container and on which said strainer is adjustably mounted.

9. In combination with a beverage container, having a dispensing spout, of a strainer consisting of a framed sieve curved to conform with the curvature of the container, a member capable of being removably suspended from the container and means on said strainer adapted to adjustably engage said strainer with said member.

LEO TAUB.